(12) United States Patent
Rogoff et al.

(10) Patent No.: US 7,945,047 B2
(45) Date of Patent: May 17, 2011

(54) CRYPTOGRAPHIC KEY DISTRIBUTION SYSTEM AND METHOD FOR DIGITAL VIDEO SYSTEMS

(75) Inventors: David Rogoff, Irvine, CA (US); Steven Petilli, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 1139 days.

(21) Appl. No.: 11/593,872

(22) Filed: Nov. 7, 2006

(65) Prior Publication Data
US 2007/0116294 A1    May 24, 2007

Related U.S. Application Data

(63) Continuation of application No. 09/991,081, filed on Nov. 16, 2001, now abandoned, which is a continuation-in-part of application No. 09/844,898, filed on Apr. 27, 2001, now abandoned.

(60) Provisional application No. 60/200,194, filed on Apr. 28, 2000.

(51) Int. Cl.
*H04L 9/00* (2006.01)
(52) U.S. Cl. .......................................... 380/200; 380/278
(58) Field of Classification Search .................. None
See application file for complete search history.

(56) References Cited

U.S. PATENT DOCUMENTS

| | | | |
|---|---|---|---|
| 4,807,284 A | 2/1989 | Kleijne | |
| 4,849,927 A | 7/1989 | Vos | |
| 5,237,610 A | 8/1993 | Gammie et al. | |
| 5,818,939 A | 10/1998 | Davis | |
| 5,915,018 A | 6/1999 | Aucsmith | |
| 5,923,754 A | 7/1999 | Angelo et al. | |
| 6,101,255 A | 8/2000 | Harrison et al. | |
| 6,223,285 B1 | 4/2001 | Komuro et al. | |
| 6,347,846 B1 | 2/2002 | Nakamura | |
| 6,577,734 B1 | 6/2003 | Etzel et al. | |
| 6,590,981 B2 | 7/2003 | Fruehauf | |
| 6,681,326 B2 | 1/2004 | Son et al. | |
| 6,789,197 B1 | 9/2004 | Saito | |

(Continued)

FOREIGN PATENT DOCUMENTS
EP    0951019 A2    10/1999
(Continued)

OTHER PUBLICATIONS

Feibel, "The Encyclopedia of Networking", 1995, p. 790.*
(Continued)

*Primary Examiner* — Minh Dinh

(57) ABSTRACT

A system and method for distribution of cryptographic keys to data encryption and decryption devices used to protect digital video/multimedia data transmitted over a display link between a digital video/multimedia source and a display device are provided. The digital data, which may be in Digital Visual Interface (DVI) format, from a digital video/multimedia source, such as, for example, a Digital Versatile Disk (DVD) player, a set-top box, or a computer, is encrypted prior to transmission on the display link. Use of key management and storage that are external to the data encryption or decryption devices enables downloading of new keys from external key sources. Encrypted data encryption and decryption keys may be included in a cable signal received by the set-top box. The data encryption and decryption keys from an internal or external key source may be encoded in the DVD player, set-top box, or computer prior to being sent over a control bus to a display link receiver or a display device.

9 Claims, 10 Drawing Sheets

U.S. PATENT DOCUMENTS

| | | | |
|---|---|---|---|
| 6,834,111 B1 | 12/2004 | Nishimura et al. | |
| 6,845,450 B1 | 1/2005 | Kobayashi et al. | |
| 6,985,591 B2 * | 1/2006 | Graunke | 380/277 |
| 7,124,938 B1 * | 10/2006 | Marsh | 235/382 |
| 2003/0005285 A1 | 1/2003 | Graunke | |
| 2003/0009669 A1 | 1/2003 | White et al. | |

FOREIGN PATENT DOCUMENTS

| | | |
|---|---|---|
| EP | 0977438 A2 | 2/2000 |
| WO | 99/22372 | 5/1999 |
| WO | 0184836 A2 | 11/2001 |

OTHER PUBLICATIONS

"High-bandwidth Digital Content Protection—White Paper", Silicon Image, Retrieved from the Internet on Mar. 31, 2006: <URL: http://www.siliconimage.com/docs/Sil-WP-002-A.pdf>. Feb. 2000.

Grossman, Steve "Two-Chip Set Safeguards Digital", Electronic Design, XP-000969197 pp. 68-70, 72, Jun. 12, 2000.

* cited by examiner

CRYPTOGRAPHIC KEY DISTRIBUTION SYSTEM AND METHOD FOR DIGITAL VIDEO SYSTEMS

CROSS-REFERENCE TO RELATED APPLICATIONS

The present application is a continuation of U.S. patent application Ser. No. 09/991,081, filed on Nov. 16, 2001, now abandoned which is a Continuation-in-Part of U.S. patent application Ser. No. 09/844,898, filed Apr. 27, 2001 now abandoned, both entitled "Cryptographic Key Distribution System and Method for Digital Video Systems." U.S. patent application Ser. No. 09/884,898 claims benefit of U.S. Provisional Application Ser. No. 60/200,194, filed Apr. 28, 2000, entitled "Cryptographic Key Distribution System and Method for Digital Video Systems." The contents of patent application Ser. Nos. 09/991,081 and 09/844,898 and Provisional Patent Application No. 60/200,194 filed Apr. 28, 2000 are incorporated by reference herein in their entirety.

FIELD OF THE INVENTION

The present invention relates to a system and method for distributing cryptographic keys to digital data encryption and decryption devices, and particularly to the distribution of cryptographic keys for digital video and/or multimedia systems.

BACKGROUND OF THE INVENTION

The use of digital technology continues to make rapid advances in many fields, and such digital technology is increasingly being applied to areas that once were completely relegated to the analog domain. One such area is distribution of motion pictures, which are increasingly being digitized and sold on DVDs (Digital Versatile Disks). The low cost and high quality afforded by DVDs have led to a boom in the sale of DVD players and DVDs.

There is a great deal of concern among content producers, e.g., the movie studios, about the release of motion pictures in digital formats. Content producers are particularly concerned about the next generation of DVDs, which will carry high definition video images. For example, a consumer can buy a DVD and duplicate it illegally without any loss in video quality if he can access the digital video signals. In order to prevent easy access to the digital video signals, most DVD players on the market today provide video output in analog format only.

DVDs containing high definition video images of motion pictures may not be available for sale unless the data on the DVDs can be protected from copying, both while on the disk and during its routing to a display device. Therefore, before consumer type DVD players with digital video outputs are available for sale, content producers and DVD player manufacturers preferably should agree on a secure way of sending digital video data from the DVD players to video display monitors or televisions.

Such digital video data is typically in parallel format and is converted to serial format (for digital video output) by a digital transmitter before being sent out on a digital display link to a video monitor or a television. On the display side, a digital receiver converts the serial data back into parallel format. The digital signal on the display link cable, if not protected, e.g., via encryption, can be intercepted and copied by a person wanting to steal the digital video data.

There is a standard digital display link for connecting a digital video signal from a computer to a display monitor, which is known as Digital Visual Interface (DVI). There is also a proposed standard for the content protection of such display links, known as High-bandwidth Digital Content Protection (HDCP), which provides for the encryption of digital video data between a digital video source and a display monitor using cryptographic keys. Both the digital video source and the display monitor should preferably have access to the cryptographic keys to encrypt and decrypt, respectively, the digital video data.

Therefore, it is desirable to provide an improved system and method for loading of the cryptographic keys to a digital video data encryptor on the digital video source side and the decryptor on the display monitor side.

SUMMARY OF THE INVENTION

Accordingly, in an example embodiment, a system for distributing a cryptographic key for encrypting digital data is provided. The system comprises a key source and a transmitter. The key source is used for storing the cryptographic key, encrypting the cryptographic key, and for transmitting the encrypted cryptographic key over a control bus. The transmitter is used for receiving the digital data, receiving the encrypted cryptographic key over the control bus, decrypting the encrypted cryptographic key to recover the cryptographic key, encrypting the digital data using the cryptographic key to generate encrypted data, and for transmitting the encrypted data.

In another example embodiment, a system for distributing a cryptographic key for decrypting encrypted data is provided. The system comprises a key source and a receiver. The key source is used for storing the cryptographic key, encrypting the cryptographic key, and for transmitting the encrypted cryptographic key over a control bus. The receiver is used for receiving the encrypted data, receiving the encrypted cryptographic key over the control bus, decrypting the encrypted cryptographic key to recover the cryptographic key, decrypting the encrypted data using the cryptographic key to generate digital data, and for transmitting the digital data.

In yet another example embodiment, a method of distributing a cryptographic key for encrypting digital data is provided. The cryptographic key is stored in a key source, and then encrypted to generate an encrypted cryptographic key. The encrypted cryptographic key is transmitted from the key source over a control bus, and loaded into a transmitter from the control bus. The encrypted cryptographic key is decrypted in the transmitter to recover the cryptographic key. The digital data is introduced into the transmitter, and encrypted using the recovered cryptographic key to generate encrypted data, which is transmitted from the transmitter.

In still another example embodiment, a method of distributing a cryptographic key for decrypting encrypted data is provided. The cryptographic key is stored in a key source, and then encrypted to generate an encrypted cryptographic key. The encrypted cryptographic key is transmitted from the key source over a control bus, and loaded into a receiver from the control bus. The encrypted cryptographic key is decrypted in the receiver to recover the cryptographic key. The encrypted data is introduced into the receiver, and decrypted using the recovered cryptographic key to generate decrypted data, which is transmitted from the receiver.

In a further example embodiment, a set-top box for distributing a cryptographic key for encrypting digital data is provided. The set-top box comprises a cable tuner, a cable signal decoder and a transmitter. The cable tuner is used for receiving a cable signal from cable headend, and for selecting one or more channels of the cable signal. The cable signal decoder is used for receiving the channels, for extracting the cryptographic key in an encrypted form from the channels, for extracting the digital data from the channels, and for transmitting the encrypted cryptographic key over a control bus. The transmitter is used for receiving the digital data, receiving the encrypted cryptographic key over the control bus, decrypting the encrypted cryptographic key to recover the cryptographic key, encrypting the digital data using the cryptographic key to generate encrypted data, and for transmitting the encrypted data.

These and other embodiments, and advantages associated with them, will become apparent from the following detailed description and the drawings.

DETAILED DESCRIPTION

One approach to the distribution of cryptographic keys has been to load the keys into a ROM (Read Only Memory) chip which is physically next to the data encryptor and on the same circuit board. If each cryptographic key is unique to the system it is used in, then each ROM has to be specifically programmed during manufacture of the system. In the conventional art, a dedicated connection between the external ROM chip and the data encryptor has been provided.

Instead of using a ROM chip adjacent to the data encryptor to store the keys, one example embodiment uses RAM (Random Access Memory) on the same integrated circuit as the data encryptor. In one embodiment, incoming digital video signal connections to the data encryptor integrated circuit is used to transmit cryptographic keys to the RAM. In other embodiments, other connections, such as, for example, an I$^2$C control bus may be used to transmit the cryptographic keys to the RAM.

Thus, these embodiments of the present invention may not require any additional pins or electrical connections to be made to the data encryptor. Given the increasing complexity of today's integrated circuits and the increasing number of pins needed for external connections, eliminating even a few extra pins may be important to meet IC (integrated circuit) design goals.

On the display side of a digital display link, a cryptographic decryptor stores the cryptographic keys needed for decoding an encrypted data stream. Similar to the case of the encryptor, the cryptographic keys conventionally have been stored in an adjacent ROM chip. In an example embodiment, the decryptor stores the decoding keys in RAM, instead of on the ROM chip. In other embodiments, the cryptographic keys may be loaded directly to the encryptor (e.g., a register on the encryptor) without being stored in memory (e.g., RAM or ROM) first.

In this embodiment, the cryptographic keys preferably are encrypted and then sent from a transmitter to a receiver over the display link. In this embodiment, all key storage preferably is managed from the transmitter. In another example embodiment, the cryptographic keys are not stored permanently in the source video system, but can be downloaded from another source, such as a set-top box.

Figure 1:
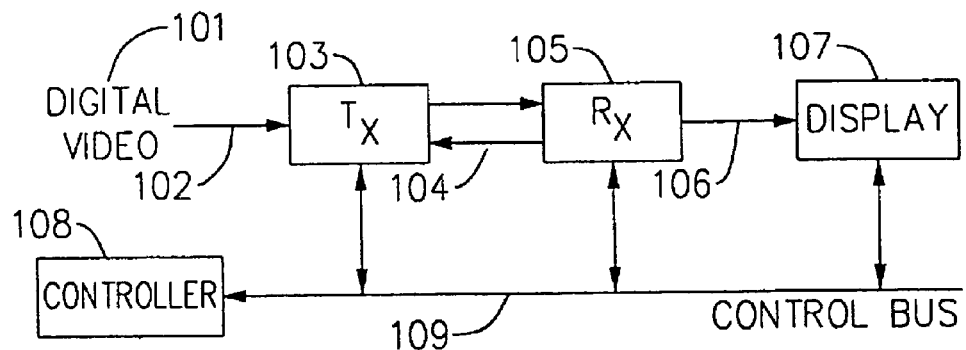
FIG. 1 is a block diagram of a digital display link system.

Referring now to FIG. 1, a block diagram of a digital display link system according to an example embodiment is illustrated. A digital video source 101 is coupled to a transmitter 103 via input lines 102. Among other processing performed by the transmitter 103, digital video data from the digital video source 101 preferably is encrypted for transmission on digital display link 104. The digital video source 101 may also provide other data, such as, for example, multimedia data and/or cryptographic keys for encryption of the digital video/multimedia data. The multimedia data may include one or more of, but is not limited to, video, audio, web content, graphics and text.

On the display side of the system, a receiver 105, among other processing operations, preferably decrypts the encrypted digital video/multimedia signal received over the digital display link 104 and produces a digital video signal, which is sent on output lines 106 to a display 107. The digital display link 104 may also be used to send decryption keys to the receiver 105 for decrypting the received encrypted digital video/multimedia signal. The overall operation of the system may be controlled by a controller 108 using a control bus 109. The controller 108 may include a finite state machine (FSM), a microprocessor, a micro controller and/or any other suitable device for controlling the overall operation of the system.

The digital display link 104 from the transmitter 103 to the receiver 105 may include a bi-directional signal path. The bi-directional signal path may be useful when, for example, there is a video camera at the display end sending video signals back to the video source end for distribution and/or processing.

The input lines 102 coupled to the transmitter 103 and the output lines 106 coupled to the receiver 105 should be physically secured to protect the digital video data on them. Thus, these input and output lines are usually within respective physical enclosures. On the other hand, the digital display link 104 includes a cable between the video source and a display, and the data flowing through the cable should be protected via encryption to prevent it from being copied illegally.

Figure 2:
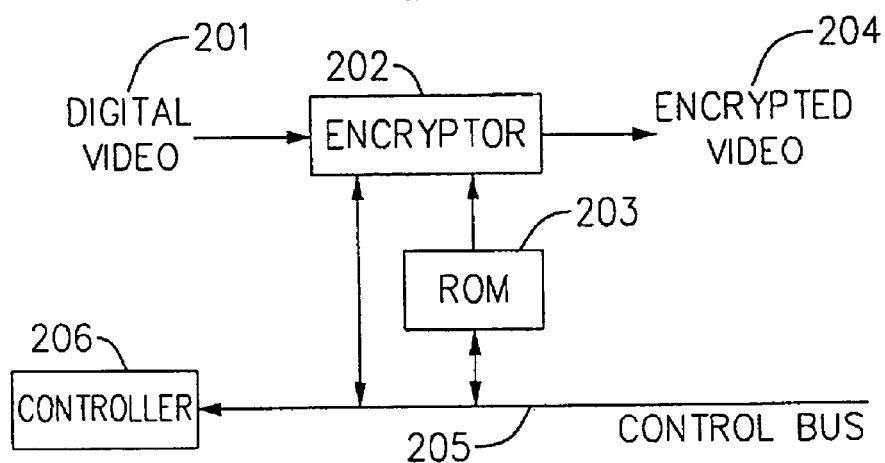
FIG. 2 is a block diagram of a cryptographic key distribution system.

FIG. 2 is a block diagram of a cryptographic key distribution system. Incoming digital video signals 201 are encrypted by an encryptor 202 according to the cryptographic keys stored in ROM 203. The ROM 203, for example, may be implemented on a separate IC chip. The encryptor 202 produces an encrypted video signal 204. Key loading and encryption are controlled by controller 206, which uses a control bus 205.

There are several limitations to the system in FIG. 2. One is that it permanently stores the encryption keys in the ROM 203 adjacent to the encryptor 202. Having the keys permanently stored on a separate integrated circuit on the circuit board makes the keys susceptible to being stolen and/or bypassed. Another difficulty is that the keys stored in a ROM cannot be changed. It would be useful to have a capability to change keys if the keys originally loaded in the equipment are compromised and need to be replaced.

The connection between the encryptor 202 and the ROM 203 may require additional pins on the encryptor package. This may be difficult to provide, especially if the encryptor 202 is a part of a larger system on a chip (SOC), which typically already has many pins with none to spare.

Figure 3:
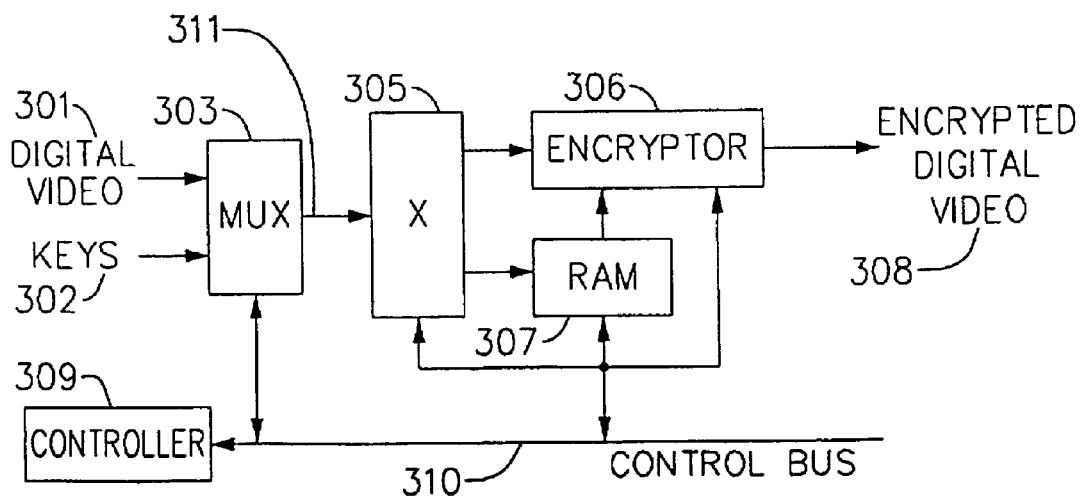
FIG. 3 is a block diagram of a cryptographic key distribution system for a digital display link transmitter.

FIG. 3 is a block diagram of an example cryptographic key distribution system for a digital display link transmitter. In the system of FIG. 3, incoming digital video signals 301 are coupled to an encryptor 306 via a multiplexer 303, incoming data lines 311 and a selector switch 305. The incoming digital video signals 301 may also include multimedia signals and/or other data. The multimedia signals may include one or more of, but is not limited to, video, audio, web content, graphics and text. The encryptor 306 preferably has a video port, which may also be referred to as a pixel port or data port, for receiving the incoming digital video signals from the selector switch 305. The encryptor 306 preferably encrypts the digital video signals 301 to produce encrypted digital video signals 308. The encrypted digital video signals 308 may also include encrypted multimedia signals and/or encrypted data.

The encryptor 306 preferably should have secure input connections (i.e., incoming data lines 311), so as to prevent the digital video signals 301, which are not encrypted, from being intercepted and/or copied. Because of the secure connections to the encryptor 306, encryption keys 302, which may also be referred to as cryptographic keys or keys, may be loaded into the encryptor 306 on the incoming data lines 311. In one example embodiment, the encryption keys preferably are loaded in RAM 307 prior to being loaded in the encryptor 306. The RAM 307 in other embodiments may be replaced by another suitable storage medium. The encryption keys are then loaded to the encryptor 306 via a key port of the encryptor. If the encryptor 306 and the RAM 307 are fabricated on the same IC chip and the incoming data lines 311 are used to input the encryption keys, there is no need for extra package pins on the display link transmitter.

Hence, prior to the start of encryption, the encryption keys 302 preferably are loaded via the multiplexer 303 onto the incoming data lines 311 to be stored in the RAM 307. The incoming data lines 311 are coupled to the RAM 307 via the selector switch 305 which selects between the encryptor 306 (e.g., for the digital video signals 301) and the RAM 307 (e.g., for the encryption keys 302). The keys stored in the RAM 307 preferably are then loaded into the encryptor 306 via the key port for encryption of the digital video signals 301.

The encryption keys loaded into the RAM 307 typically are stored there temporarily and may be reloaded as needed from internal or external sources, such as a software program, an encrypted DVD, a smart card, a set-top box, a cable modem or any other suitable key source. The encryption keys may also be stored in a ROM or PROM module within another system chip upstream of the encryptor system.

The operation of the system in FIG. 3 preferably is controlled by a controller 309 using a control bus 310. The control bus 310, for example, may include an $I^2C$ control bus or any other suitable control bus. The controller, for example, may include a finite state machine (FSM), a microprocessor, a micro controller, an ASIC or any other suitable device for controlling traffic on the control bus 310.

In other embodiments, the encryption keys may be loaded directly onto a register in the encryptor 306 and not stored in the RAM 307 or any other memory. In still other embodiments, the encryption keys may be loaded to either the RAM 307 or the encryptor 306 via the control bus 310, which may be an $I^2C$ control bus. In this case, since the encryption keys 302 do not have to share the incoming data lines 311 with the digital video signals 301, the multiplexer 303 and/or the selector switch 305 may not be needed.

Figure 4:
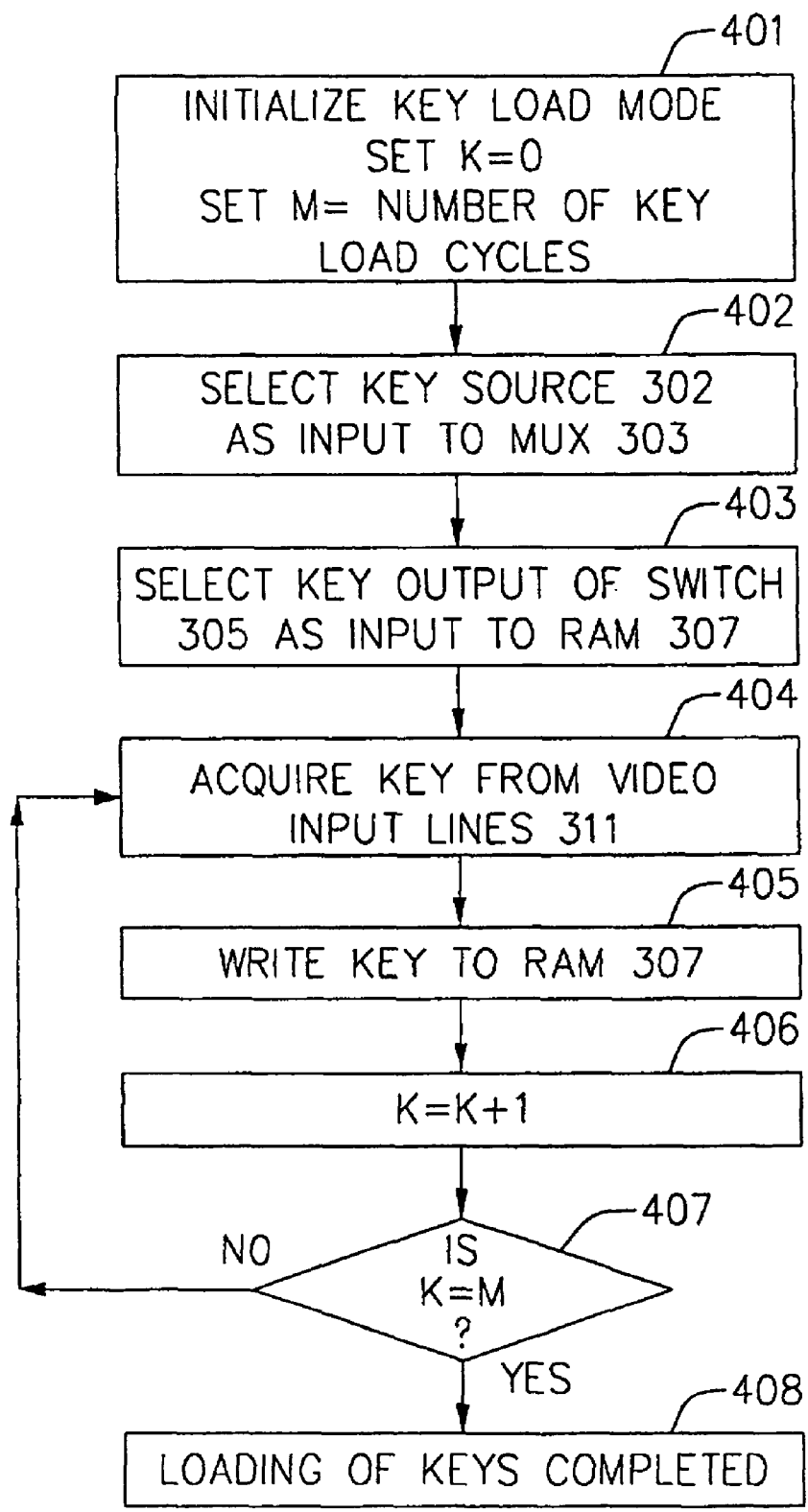
FIG. 4 is a general flowchart of overall operations involved in the process of loading cryptographic keys into an encryptor.

FIG. 4 is a general flowchart of operations in the process of loading cryptographic keys into an encryptor, such as, for example, the encryptor 306 of FIG. 3. The loading of the cryptographic keys is initialized in step 401 and a counter K is reset to zero. The counter K preferably keeps track of the number of times a different key or segment of a key has been loaded into RAM, such as, for example, the RAM 307 of FIG. 3. For example, loading of different keys or key segments are used in situations when more than one key is required for encryption or when a key is split into segments because the key is too long to be loaded in one load cycle.

If video input lines, such as, for example, the incoming data lines 311 of FIG. 3, carry a composite video RGB signal, there are three channels of data. If the data on the video input lines is in a parallel format and each data element is a byte, then the video input lines include 24 parallel data lines within. This allows a 24-bit key or segment of a key to be input into the encryptor during a single key load cycle. If a key is part of a set of keys, then multiple load cycles may be needed to load all of the keys. A variable M is set during step 401 to the number of load cycles needed to load all the keys or key segments needed by the encryptor.

In step 402, a key source, which contains keys, such as, for example, the encryption keys 302 of FIG. 3, preferably is selected as input to a multiplexer, such as, for example, the multiplexer 303 of FIG. 3. In step 403, a key output of a switch, such as, for example, the switch 305 of FIG. 3, preferably is selected as input to the RAM. Selecting these two paths provides a path from key source 302 to RAM 307.

In step 404, a key or key segment from the key source preferably is acquired via the video input lines. In step 405, the acquired key preferably is loaded into the RAM. In step 406, the counter K, which is equal to the number of load cycles performed, preferably is incremented by 1.

In step 407, the counter K preferably is compared to M, where M is the number of load cycles needed to load all the needed keys. If the counter K is equal to M, then the loading of the keys has been completed as indicated in step 408. If the counter K is less than M, then steps 404, 405 and 406 preferably are repeated to acquire the next key or key segment, and the counter K, after being incremented by 1, is compared once again with M. Hence, steps 404, 405, 406 and 407 are repeated in a loop until all the keys or key segments are loaded.

Figure 5:
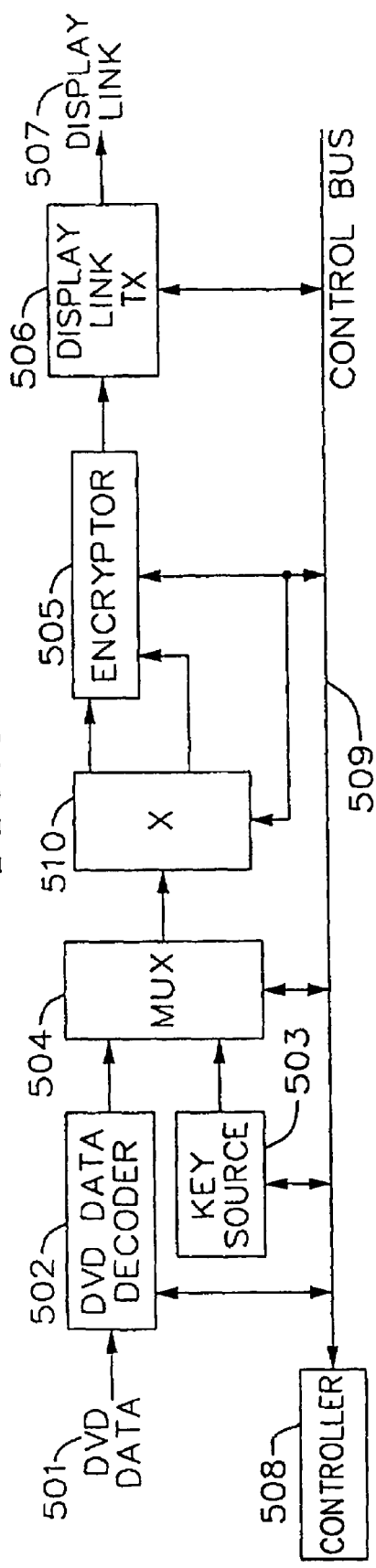
FIG. 5 is a block diagram of an encryption system within a DVD player.

FIG. 5 is a block diagram of an encryption system within a DVD player in an example embodiment. DVD data 501 from a DVD reader is input to a DVD data decoder 502. The DVD data 501 may include video data and/or multimedia data. The DVD data 501 may also include other data, such as, for example, graphics or closed caption information. The DVD data decoder 502 preferably decodes the DVD data 501 to generate digital video, multimedia and/or other data. A multiplexer 504 couples either the digital video from the DVD data decoder 502 or cryptographic keys from a key source 503 to a selector switch 510. The key source 503 may include any suitable storage medium for storing the cryptographic keys.

The selector switch 510 preferably provides the digital video, multimedia and/or other data for encryption to the encryptor 505 via a video port, which may also be referred to as a pixel port or a data port. The selector switch 510 preferably also provides the cryptographic keys to the encryptor 505 via a key port. The encryptor 506 preferably contains a register for storing the received cryptographic keys.

In other embodiments, the key source 503 may provide the cryptographic keys to a RAM external to the encryptor 505 via the multiplexer 504 and the selector switch 510 and not directly to the key port on the encryptor 505. In this case, the cryptographic keys may be stored in the RAM temporarily, and then loaded onto the register in the encryptor 505 via the key port as needed for encryption of the digital video, multimedia, and/or other data. The RAM may be implemented on the same integrated circuit chip as the encryptor 505.

After the encryption, the encrypted digital video, as well as the encrypted multimedia and/or other encrypted data, preferably is sent to a display link transmitter 506, which provides an output signal suitable for transmission over display link 507. The encrypted digital video, multimedia and/or other data preferably are encrypted in such a way that interception and/or decryption of the digital video, multimedia and/or other data preferably is prevented.

The operation of the system in FIG. 5 preferably is controlled by a controller 508 using a control bus 509. The control bus 509, for example, may include an I²C control bus or any other suitable control bus. The controller, for example, may include a finite state machine (FSM), a microprocessor, a micro controller, an ASIC or any other suitable device for controlling traffic on the control bus 509.

In other embodiments, the cryptographic keys may be loaded to either the RAM or directly to the encryptor 505 via the control bus 509, which may be an I²C control bus. In this case, since the cryptographic keys from the key source 503 do not have to share incoming data lines from the multiplexer 504 with the digital video, multimedia and/or other data, the multiplexer 504 and/or the selector switch 510 may not be needed.

The encryptor 505 may also encode video decryption keys and transmit over the display link to a digital display link receiver to be used for decryption of the encrypted digital video, multimedia and/or other data at the receiver side (e.g., display side). The encoded video decryption keys are decoded at the receiver side prior to the decryption of the encrypted digital video, multimedia and/or other data. The encoding and decoding of the cryptographic keys are described further in reference to FIG. 6.

Figure 6:
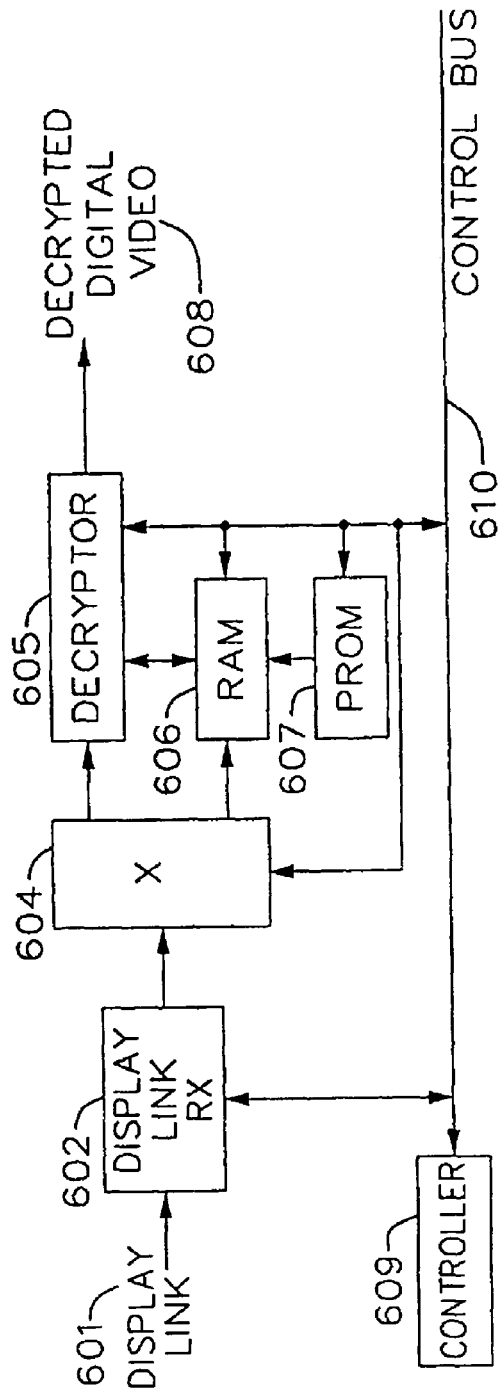
FIG. 6 is a block diagram of a digital display link receiver including a decryptor.

FIG. 6 is a block diagram of a digital display link receiver including a decryptor 605 in an example embodiment. Incoming serial data preferably arrives over a display link 601. The incoming serial data preferably includes encrypted digital video, multimedia and/or other data, and may have been transmitted over the display link 507 of FIG. 5.

During normal operation, the incoming serial data preferably is received by a display link receiver 602. The display link receiver 602 preferably converts the incoming serial data into video data in parallel format and sends the parallel video data to the decryptor 605 via a switch 604. The display link receiver 602 may also extract multimedia and/or other data from the incoming serial data, and send to the decryptor 605 for decryption. The decryptor 605 preferably generates decrypted digital video 608, which may include decrypted multimedia and/or decrypted data, and sends it via physically secure internal wiring to a video display or monitor.

The operation of the system in FIG. 6 preferably is controlled by a controller 609 using a control bus 610. The control bus 610, for example, may include an I²C control bus or any other suitable control bus. The controller, for example, may include a finite state machine (FSM), a microprocessor, a micro controller, an ASIC or any other suitable device for controlling traffic on the control bus 610.

Prior to the start of decryption of the encrypted digital video, multimedia and/or other data, a public key system is used to cipher the video decryption keys, so that they can be sent via the digital display link to the decryptor 605. A public key preferably is loaded from a key source, such as, for example, the key source 503 of FIG. 5, into an encryptor, such as, for example the encryptor 505. A corresponding private key preferably is loaded from PROM 607 into RAM 606. The private key is used to decipher the video decryption keys sent from the display link transmitter in FIG. 5. The video decryption keys needed by the decryptor 605 preferably are provided by the key source and encrypted by the encryptor, and sent to the display link receiver in FIG. 6 during a startup procedure. In other embodiments, the private key may be loaded directly to a decryptor register from the PROM 607 via a key port of the decryptor 605 without being stored temporarily in RAM.

Public key cryptography is well known to those skilled in the art and the public key cryptography used in this embodiment is one example of the use of public key cryptography to protect the transmission of decryption keys to the receiver. In other embodiments, other cryptographic systems may be used to protect the keys during transmission to the receiver. For example, in one example embodiment, DES (Data Encryption Standard) encoding and decoding may be used to encode and decode keys.

The display link receiver in FIG. 6 receives the ciphered video decryption keys on the display link 601. The ciphered video decryption keys are extracted by the display link receiver 602. The ciphered video decryption keys are input to the decryptor 605, which uses the private key stored in the PROM 607 to decipher the video decryption keys, which are then stored in the RAM 606. Once the RAM 606 has all the keys needed for video decryption, then the display link receiver is ready to start decrypting the encrypted video data sent by a display link transmitter, such as, for example, the display link transmitter 506 of FIG. 5.

The following list of events provides an overview of the initialization process performed at startup to load video decryption keys into the display link receiver:

Steps 2 to 6 take place in the display link transmitter. Steps 1, 7 to 9, 11 take place in the display link receiver:

1. Load private key from the PROM 607 into the RAM 606.
2. Load public key from the key source 503 into the encryptor 505.
3. Load video decryption key from the key source 503 as data into the encryptor 505.
4. Cipher the video decryption key using the public key loaded in the encryptor 505.
5. Send the ciphered video decryption key to the display link transmitter 506.
6. Transmit the ciphered video decryption key via the display link 507.
7. Receive the ciphered video decryption key at the display link receiver 602.

8. Decipher the ciphered video decryption key received from the display link transmitter 506 using private key from the PROM 607.

9. Load the video decryption key into the RAM 606.

10. Repeat steps 3 to 9 until all video decryption key segments or video decryption keys have been loaded into the RAM 606.

11. Load the video decryption keys from the RAM 606 into the decryptor 605.

12. Ready to start decrypting encrypted digital video.

In an another example embodiment, a method for loading data encryption keys (which may also be referred to as video keys, data keys or cryptographic keys) into a digital display link transmitter or receiver is provided. In this embodiment, the data encryption keys preferably are encrypted and a control bus is used to send the encrypted data encryption keys to the transmitter or the receiver. The data encryption keys preferably are encrypted using an encryption key, which preferably is located closely to the source of the data encryption keys. The encrypted data encryption keys preferably are decrypted using a decryption key, which may be on the same integrated circuit as the digital display link transmitter or receiver.

A DVI (Digital Video Interface) system typically uses an I$^2$C control bus for sending control information between a DVI transmitter and a DVI receiver. In one embodiment of the invention, the I$^2$C control bus in a DVI system can be used to send encrypted data encryption keys to a DVI transmitter and a DVI receiver.

Those skilled in the art would appreciate that there are a variety of cryptographic systems, which can be used to protect the data encryption keys. There are many cryptographic protocols, two of the best known being symmetric systems and public key systems. In symmetric systems, such as DES, the same key is used for encryption and decryption. In public key systems, such as RSA, the encryption key is public and the decryption key is private.

Figure 7:
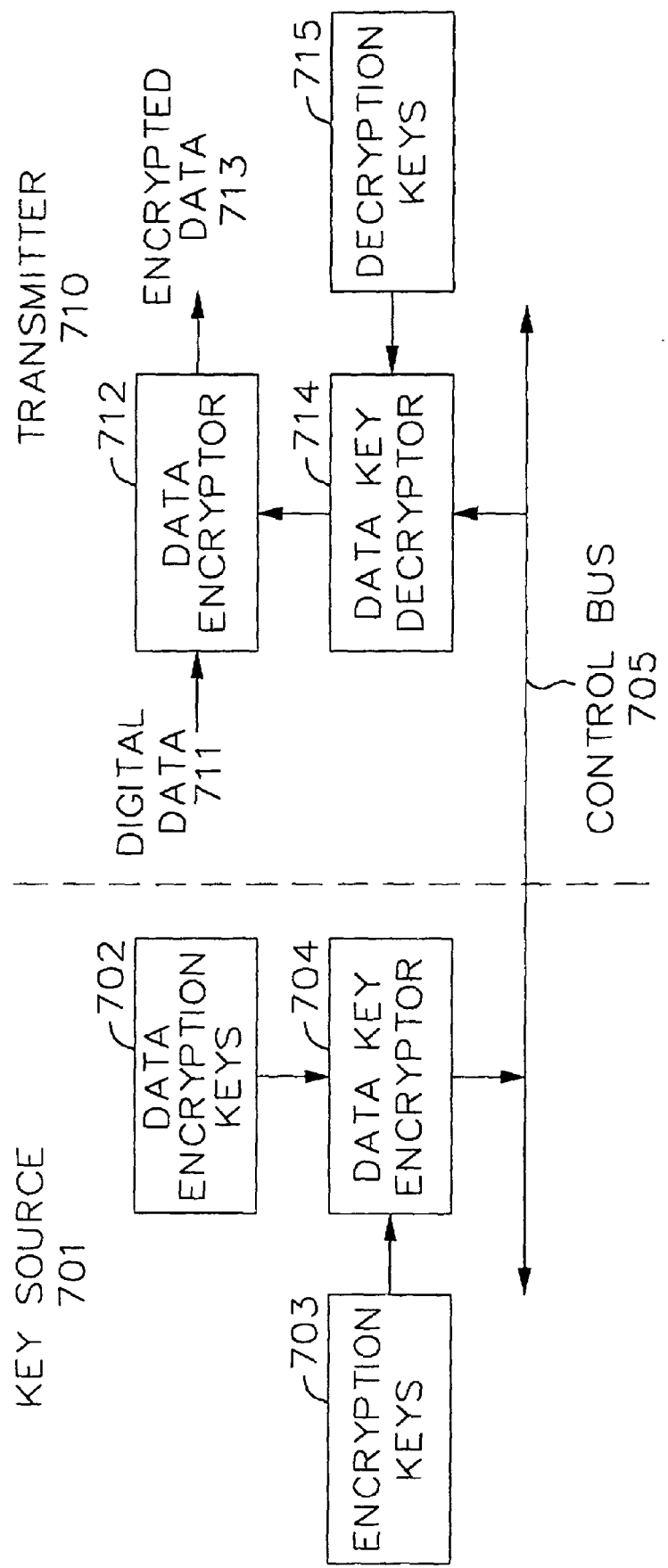
FIG. 7 is a block diagram of a cryptographic key distribution system for a digital display link transmitter.

FIG. 7 is a block diagram of a cryptographic key distribution system for a digital display link transmitter in an example embodiment. There are two systems shown in FIG. 7: a key source 701 and a display link transmitter 710. The display link transmitter 710 preferably is a digital transmitter, which transmits data in DVI format. In other embodiments, the display link transmitter 710 may also be an analog transmitter.

Those skilled in the art would appreciate that the key source 701 and the display link transmitter 710 can be in various different configurations. For example, the key source 701 and the display link transmitter 710 may be within a same physical device, such as a set-top box, or they could be in two or more separate physical systems. Further, those skilled in the art would appreciate that the key source 701 and/or the display link transmitter 710 may comprise additional components that are not illustrated in FIG. 7.

The key source 701 includes data encryption keys 702, which may be stored in memory. The data encryption keys 702 preferably are encrypted by a data key encryptor 704 using encryption keys 703, which may also be stored in memory. The encrypted data encryption keys preferably are sent to the display link transmitter 710 over a control bus 705, which may be an I$^2$C control bus.

At the transmitter 710, the encrypted data encryption keys are received over the control bus 705. Then the encrypted data encryption keys preferably are decrypted by a data key decryptor 714 using decryption keys 715. The decryption keys 715 may be stored in memory, such as, for example, a Programmable Read Only Memory (PROM), which may be on the same integrated circuit (IC) or on the same printed circuit board (PCB) as the rest of the display link transmitter 710.

A data encryptor 712 uses the data encryption keys recovered by the data key decryptor 714 to encrypt digital data 711 to generate encrypted data 713. The encrypted data 713 is then ready for further processing and/or transmission by the display link transmitter 710. The digital data 711 may include one or more of, but is not limited to, multimedia, video, audio, web contents, graphics and text.

Most of the systems, subsystems and connections shown in FIG. 7 should be physically secured to protect the data and keys while in an unencrypted form. Further, the encrypted data encryption keys carried by the control bus 705 and the encrypted data 713 preferably are protected from eavesdropping through the respective encryption, and preferably do not require additional security measures.

Figure 8:
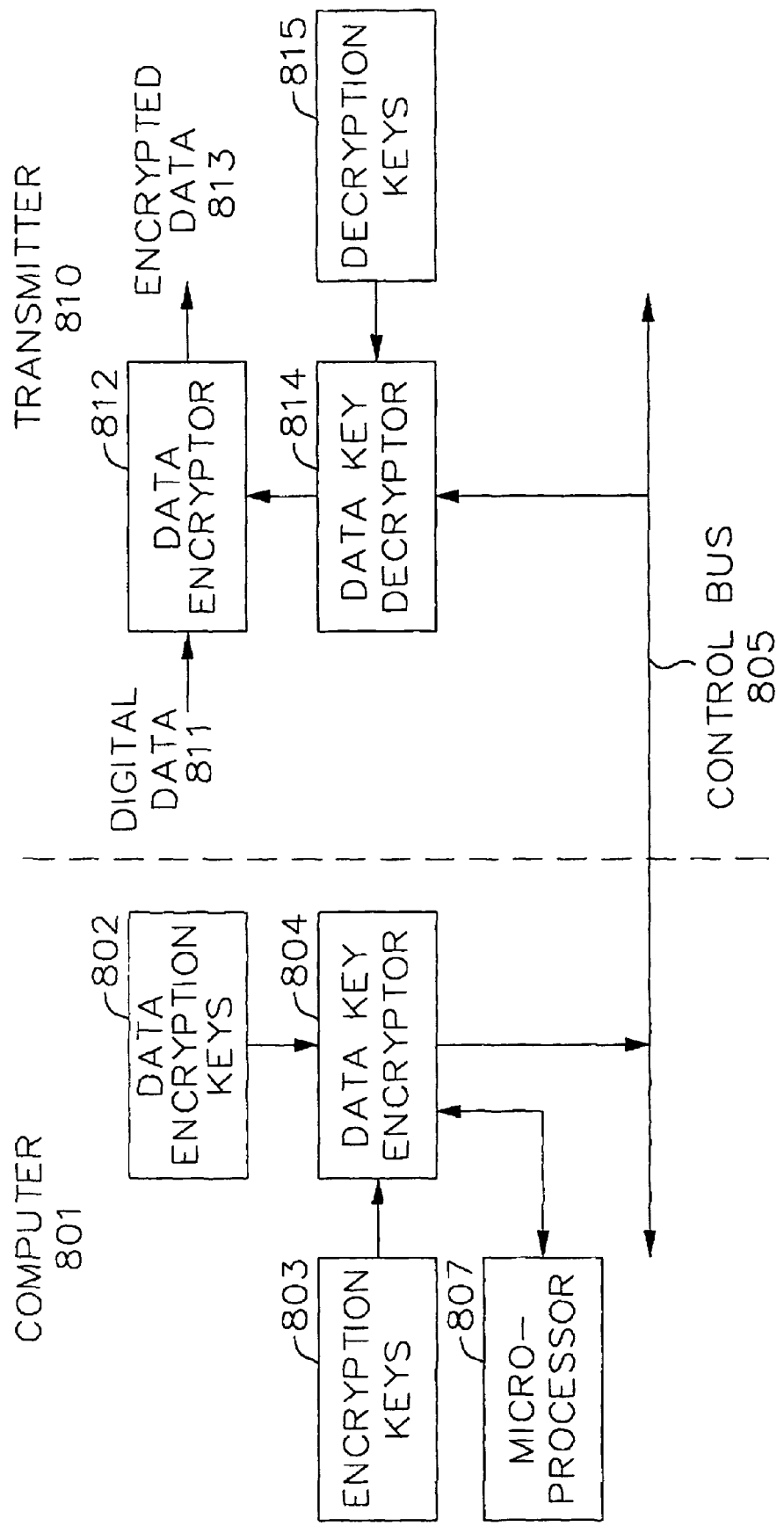
FIG. 8 is a block diagram of a cryptographic key distribution system for sending encrypted keys from a computer system to a digital display link transmitter.

FIG. 8 is a block diagram of a cryptographic key distribution system for sending encrypted data encryption keys from a computer system 801 to a display link transmitter 810 in an example embodiment. The display link transmitter 810 preferably is a digital transmitter, which preferably transmits data in DVI format. In other embodiments, the display link transmitter 810 may be an analog transmitter.

Those skilled in the art would appreciate that the computer system 801 and the display link transmitter 810 may include other components in addition to the components illustrated in FIG. 8. Further, those skilled in the art would appreciate that the computer system 801 and the display link transmitter 810 may have various different configurations. For example, the computer system 801 and the display link transmitter 810 may be within the same physical device, such as a personal computer, or they may be in two or more physically separate devices.

The computer system 801 includes data encryption keys 802, which may be stored in memory and which preferably are encrypted by a data key encryptor 804 using encryption keys 803, which may also be stored in memory. The data key encryptor 804 preferably is implemented using software, but may be implemented using software, firmware, hardware or any combination thereof. For encryption of the data encryption keys, the data key encryptor 804 may work together with a microprocessor 807 of the computer system 801. For example, when the data key encryptor 804 is in a form of software, it may run on the microprocessor 807.

The encrypted data encryption keys preferably are sent to the display link transmitter 810 over a control bus 805, which may be an I$^2$C control bus. At the display link transmitter 810, the encrypted data encryption keys are received over the control bus 805, and preferably are decrypted by a data key decryptor 814 using decryption keys 815. The decryption keys 815 may be stored in memory, such as, for example, a Programmable Read Only Memory (PROM), which may be on the same integrated circuit (IC) or on the same printed circuit board (PCB) as the rest of the display link transmitter 810.

A data encryptor 812 preferably uses the data encryption keys recovered by the data key decryptor 814 to encrypt digital data 811 to generate encrypted data 813. The encrypted data 813 is then ready for further processing in the display link receiver 810 and/or to be sent to a display link receiver. The digital data 811 may include one or more of, but is not limited to, multimedia, video, audio, web contents, graphics and text.

Most of the systems, subsystems and connections shown in FIG. 8 should be physically secured to protect data and keys while in an unencrypted form. The encrypted keys carried over the control bus 805 and the encrypted data 813 preferably are protected from eavesdropping through the respective encryption, and preferably do not require additional security measures.

Figure 9:
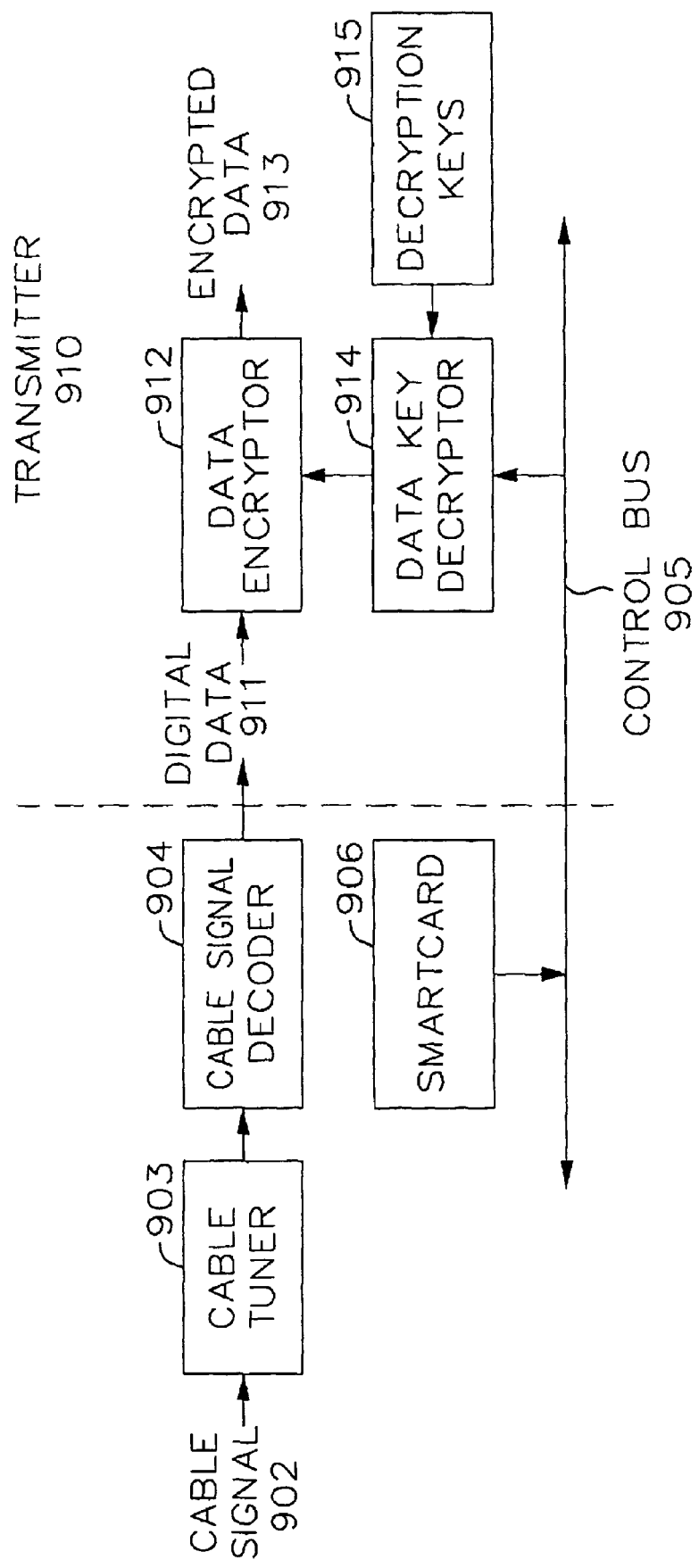
FIG. 9 is a block diagram of a cryptographic key distribution system for sending cryptographic keys from a set-top box smartcard to a digital display link transmitter.

FIG. 9 is a block diagram of a cryptographic key distribution system for sending cryptographic keys from a set-top box smartcard 906 to a display link transmitter 910 in an example embodiment. The display link transmitter 910 preferably is a digital transmitter, which preferably transmits data in DVI format. In other embodiments, the display link transmitter 910 may be an analog transmitter. The systems shown in FIG. 9 represent a portion of the systems in a set-top box, which may include additional components not illustrated in FIG. 9.

An incoming cable signal 902 is processed by a cable tuner 903 to select a desired channel, which is sent to a cable signal decoder 904. The output of the cable signal decoder 904 is digital data 911, which is sent to the display link transmitter 910. The digital data 911 may contain video as well as other data, such as, for example, multimedia data. The multimedia data may include one or more of, but is not limited to, video, audio, web content, graphics, text and other information. The display link transmitter 910, only a portion of which is shown in FIG. 9, preferably converts the incoming digital data 911 to encrypted data 913.

Prior to encrypting any of the digital data 911, encryption keys should be loaded into the display link transmitter 910. Encrypted data encryption keys preferably are loaded into the smartcard 906, and preferably are sent to the display link transmitter over a control bus 905 to the display link transmitter 910. The encrypted data encryption keys preferably are decrypted by a data key decryptor 914 using decryption keys 915. The decryption keys 915 may be stored in memory, such as, for example, a Programmable Read Only Memory (PROM), which may be on the same integrated circuit (IC) or on the same printed circuit board (PCB) as the rest of the display link transmitter 910. A data encryptor 912 preferably encrypts the digital data 911 into the encrypted data 913 using the data encryption keys generated by the data key decryptor 914.

Most of the various systems, subsystems and connections shown in FIG. 9 should be physically secured to protect data and keys while in an unencrypted form. The encrypted data encryption keys 907 carried over the control bus 905 and the encrypted data 913 preferably are protected from eavesdropping, and preferably do not require additional security measures.

Figure 10:
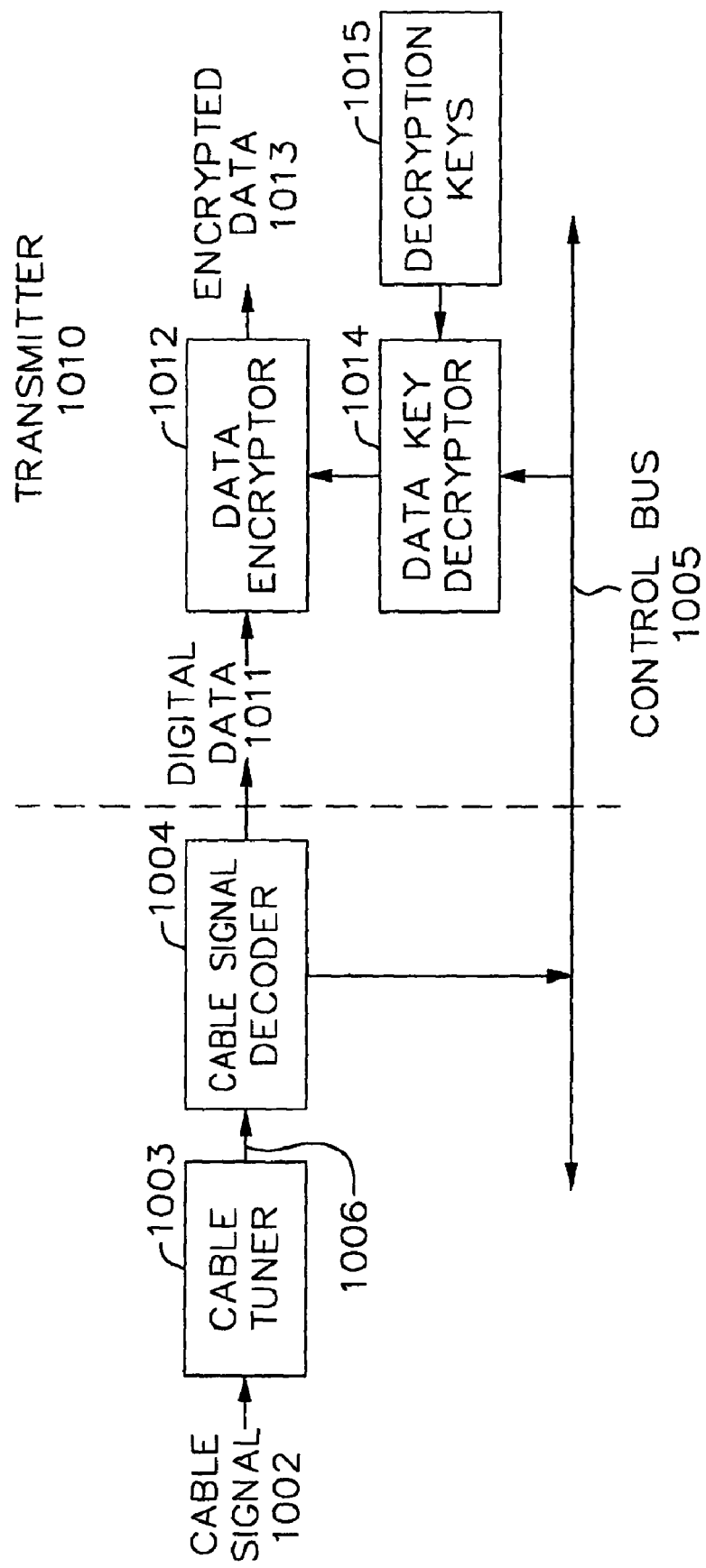
FIG. 10 is a block diagram of a cryptographic key distribution system for sending cryptographic keys from a cable headend to a digital display link transmitter.

FIG. 10 is a block diagram of a cryptographic key distribution system for sending cryptographic keys from a cable headend to a display link transmitter 1010 in an example embodiment. The display link transmitter 1010 preferably is a digital transmitter, which preferably transmits data in DVI format. In other embodiments, the display link transmitter 1010 may be an analog transmitter. FIG. 10, for example, may represent a portion of a set-top box. Those skilled in the art would appreciate that set-top boxes would include other components not illustrated in FIG. 10.

An incoming cable signal 1002 is processed by a cable tuner 1003 to select a desired channel, and a cable tuner output 1006 is sent to a cable signal decoder 1004. One output of the cable signal decoder 1004 is digital data 1011, which is sent to the display link transmitter 1010. A data encryptor 1012, which is a part of the display link transmitter 1010, preferably encrypts the digital data 1011 into encrypted data 1013.

Some channels of the incoming cable signal 1002 may carry premium content, such as HDTV movie signals (e.g., pay-per-view), which should be encrypted using data encryption (cryptographic) keys before they are sent from a set-top box to a display. The data encryption keys needed to encrypt the HDTV video may be downloaded from the cable headend. The data encryption keys in encrypted form may be downloaded using the same channel as the HDTV movie signals or using another channel. The cable signal decoder 1004 may extract the encrypted data encryption keys from the cable tuner output 1006.

Prior to the encryption of any digital data 1011, the encryption keys preferably are loaded into the transmitter 1010. The encrypted data encryption keys preferably are sent to the transmitter 1010 over a control bus 1005, which may be an I$^2$C control bus. The encrypted data encryption keys preferably are decrypted by a data key decryptor 1014 using decryption keys 1015. The decryption keys 1015 may be stored in memory, such as, for example, a Programmable Read Only Memory (PROM), which may be on the same integrated circuit (IC) or on the same printed circuit board (PCB) as the rest of the display link transmitter 1010.

A data encryptor 1012 encrypts the digital data 1011 into encrypted data 1013 using the data encryption keys generated by the data key decryptor 1014. The digital data stream 1011 may also contain data other than the HDTV movie signals, such as, for example, video and multimedia data. The multimedia data may include one or more of, but is not limited to, video, audio, web contents, graphics, text and other information.

Most of the various systems, subsystems and connections shown in FIG. 10 should be physically secured to protect data and keys while in an unencrypted form. The encrypted data encryption keys carried over the control bus 1005 and the encrypted data 1013 preferably are protected from eavesdropping, and preferably do not require additional security measures.

Figure 11:
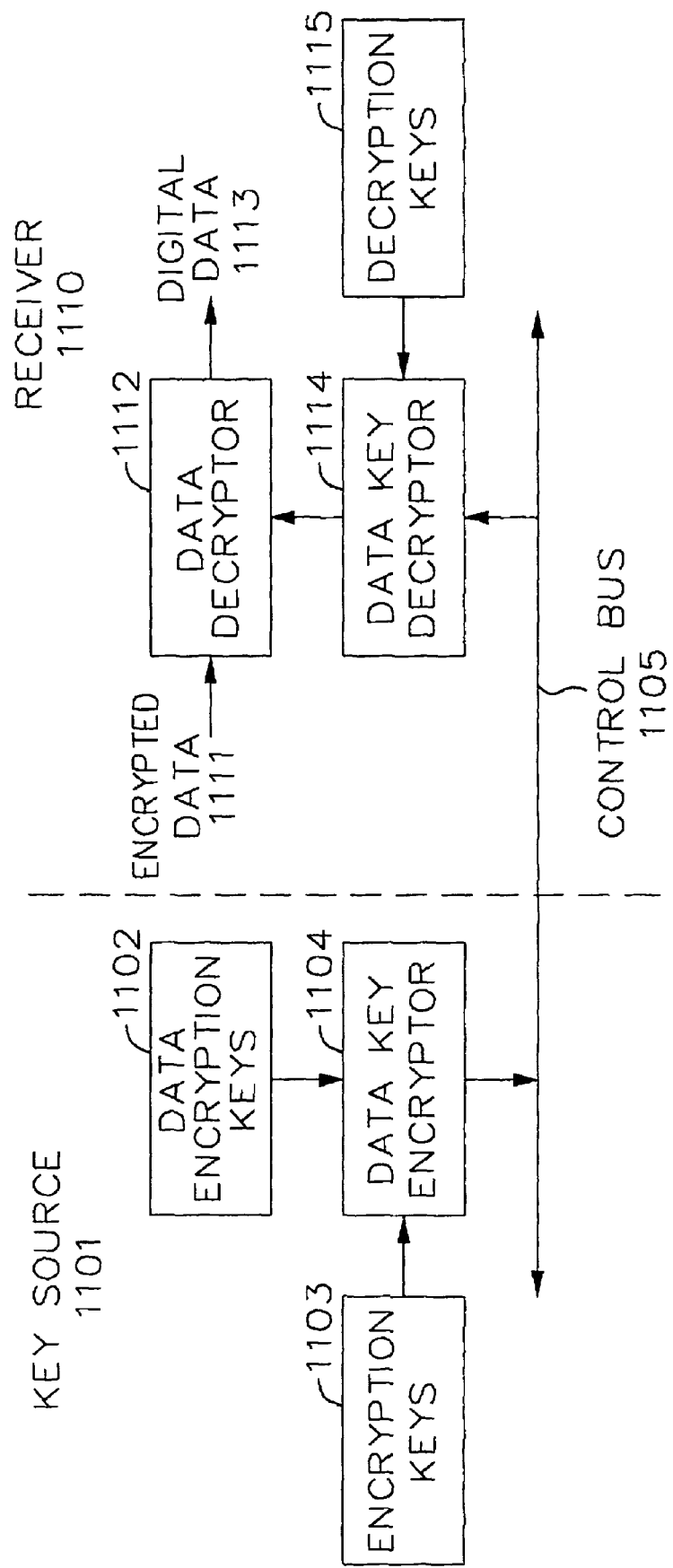
FIG. 11 is a block diagram of a cryptographic key distribution system for sending cryptographic keys from a key source to a digital display link receiver.

FIG. 11 is a block diagram of a cryptographic key distribution system for sending cryptographic keys from a key source 1101 to a display link receiver 1110 in an example embodiment. The display link receiver 1110 preferably is a digital receiver, which preferably receives data in DVI format. In other embodiments, the display link receiver may be an analog receiver. Those skilled in the art would appreciate that the key source 1101 and the data link receiver 1110 may include other components that are not illustrated in FIG. 11. Those skilled in the art would also appreciate that the key source 1101 and the data link receiver 1110 may have various different configurations. For example, the key source 1101 may be in a set-top box, a DVD player or a personal computer while the display link receiver 1110 may be in a digital monitor or an HDTV.

The key source 1101 preferably includes data encryption keys 1102, which may be stored in memory, and which preferably are encrypted by a data key encryptor 1104 using encryption keys 1103, which may also be stored in memory. The encrypted data encryption keys preferably are sent to the display link receiver 1110 over a control bus 1105, which may be an I$^2$C bus. At the display link receiver 1110, the encrypted data encryption keys are received from the control bus 1105, and preferably are decrypted by a data key decryptor 1114 using decryption keys 1115, which may be stored in memory.

A data decryptor 1112 uses the data decryption keys generated by the data key decryptor 1114 to decrypt encrypted data 1111 to generate digital data 1113. The digital data 1113 is then ready for further processing by the display link receiver 1110 and/or transmission to a display device. The encrypted data may be received from a set-top box, a computer, a DVD player or any other video/data source that outputs data in an encrypted form. The encrypted data 1111 may include one or more of, but is not limited to, multimedia, video, audio, web contents, graphics, text or other data.

Most of the systems, subsystems and connections shown in FIG. 11 should be physically secured to protect data and keys while in an unencrypted form. The encrypted keys carried over the control bus 1105 and the encrypted data 1111 preferably are protected from eavesdropping, and preferably do not require additional security measures.

Figure 12:
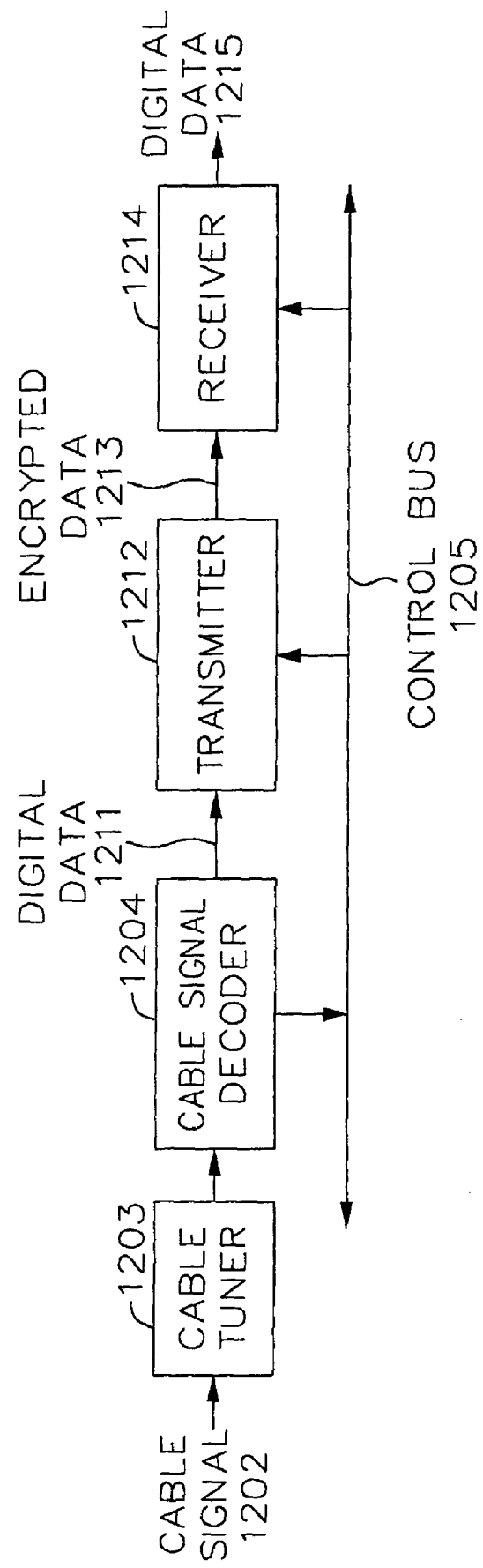
FIG. 12 is a block diagram of a cryptographic key distribution system for sending cryptographic keys from a cable headend to a digital display link transmitter and receiver.

FIG. 12 is a block diagram of a cryptographic key distribution system for sending cryptographic keys from a cable headend to a display link transmitter 1212 and a display link receiver 1214 in an example embodiment. For example, the cryptographic key distribution system of FIG. 12, for example, may include a part of a set-top box comprising a cable tuner 1203, a cable signal decoder 1204, the display link transmitter 1212 and the display link receiver 1214.

An incoming cable signal 1202 from the cable headend preferably is processed by the cable tuner 1203 to select a desired channel, which preferably is sent to the cable signal decoder 1204. One output of the cable signal decoder 1204 is digital data 1211, which is sent to the display link transmitter 1212. The display link transmitter 1212 preferably converts digital data 1211 to an encrypted data stream 1213. To this end, the display link transmitter 1212 may include a data encryptor similar to the data encryptor 1012 of FIG. 10.

The encrypted data 1213 preferably is introduced into the display link receiver 1214. The display link receiver 1214 may include a data decryptor similar to the data decryptor 1112 of FIG. 11. Digital data output 1215 of the display link receiver 1214 may be sent to a digital display. The display link receiver 1214 may be a part of the digital display so that the digital data 1215 is physically protected within the display system.

Some channels of the incoming cable signal 1202 may carry premium content, such as HDTV movie signals (e.g., pay-per-view), which should be encrypted before they are sent from the set-top box over a display link to a digital display. Data encryption keys used by the display link transmitter 1212 to encrypt the HDTV movie signals may be downloaded from the cable headend, using the same channel as the HDTV movie signals or using another channel. The cable signal decoder 1204 preferably extracts encrypted data encryption and decryption keys from the output of the cable tuner 1203.

Both the encrypted data encryption keys and the encrypted data decryption keys preferably are sent over a control bus 1205, which may be an I²C bus. The encrypted data encryption keys preferably are loaded to the display link transmitter 1212 from the control bus 1205, prior to encryption of any digital data 1211. The encrypted data decryption keys preferably are loaded to the display link receiver 1214 from the control bus 1205, prior to any decryption of the encrypted data 1213.

In addition to video such as HDTV movie signals, the digital data stream 1211 may also contain other data, such as, for example, multimedia data. The multimedia data may include one or more of, but is not limited to, video, audio, web contents, graphics, text and other information.

Most of the various systems, subsystems and connections shown in FIG. 12 should be physically secured to protect data and keys while in an unencrypted form. The encrypted keys carried over the control bus 1205 and the encrypted video data 1213 preferably are protected from eavesdropping, and preferably do not require additional security measures.

Figure 13:
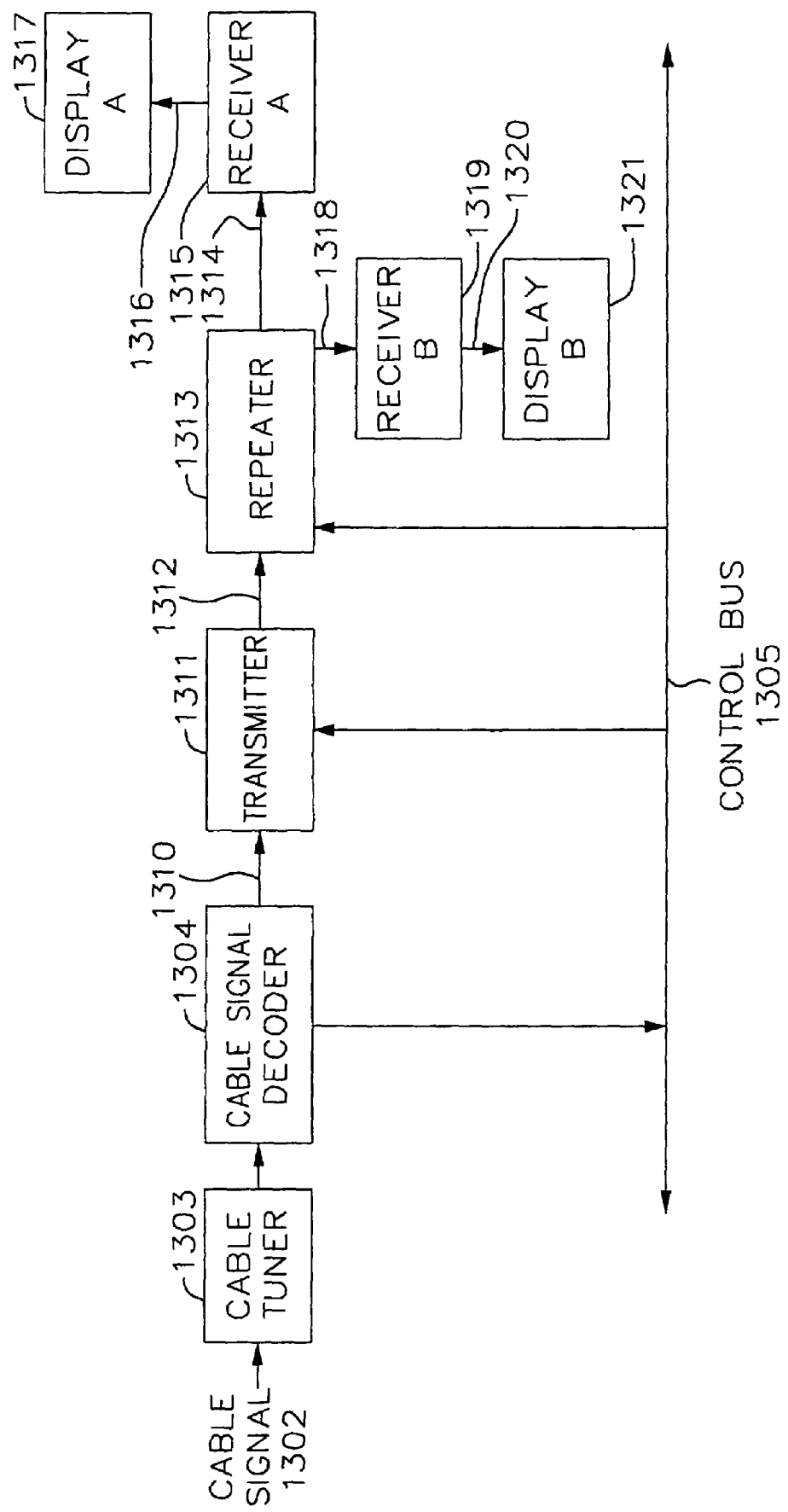
FIG. 13 is a block diagram of a cryptographic key distribution system for sending cryptographic keys from a cable headend to a digital display link transmitter, repeater and receivers.

FIG. 13 is a block diagram of a cryptographic key distribution system for sending cryptographic keys from a cable headend to a display link transmitter 1311, a repeater 1313 and receivers in an another example embodiment. The cryptographic key distribution system of FIG. 13, for example, may include a part of a set-top box including a cable tuner 1303, a cable signal decoder 1304 and a display link transmitter 1311.

An incoming cable signal 1302 from the cable headend is processed by the cable tuner 1303 to select a desired channel, which is sent to the cable signal decoder 1304. One output of the cable signal decoder 1304 is digital data 1310, which is provided to the display link transmitter 1311. The display link transmitter 1311 preferably converts the digital data 1310 to encrypted data, which is sent to the repeater 1313 via display link 1312. For such encryption, the display link transmitter 1311 may include a data encryptor similar to the data encryptor 1012 of FIG. 10.

The repeater 1313 preferably decrypts the incoming encrypted data and then encrypts the resulting digital data and sends it out to a receiver A (1315) and to a receiver B (1319) via display links 1314 and 1318, respectively. The receiver A (1315) preferably decrypts the incoming encrypted data and sends the resulting digital data to a display A (1317). The receiver B (1319) preferably decrypts the incoming encrypted data and sends the resulting digital data to a display B (1321).

Some channels of the incoming cable signal 1302 may carry premium content, such as HDTV movie signals (e.g., pay-per-view), which should be encrypted before they can be sent from a set-top box over a display link to a digital display. Data encryption and decryption keys used by the display link transmitter 1311, the repeater 1313 and the receivers A and B (1315, 1319) may be downloaded from the cable headend using the same channel as the HDTV movie signals or using another channel. The cable signal decoder 1304 preferably extracts the encrypted data encryption and decryption keys from the output of the cable tuner 1303.

The encrypted data encryption and decryption keys preferably are sent over a control bus 1305, which may be an I²C control bus. The encrypted data encryption keys preferably are loaded from the control bus 1305 into the display link transmitter 1311. The encrypted data decryption and encryption keys preferably are loaded from the control bus 1305 into the repeater 1313.

In an alternate embodiment according to the present invention, for example, the repeater 1313 preferably provides the encrypted data decryption keys from the control bus 1305 to the display link receivers A and B (1315, 1319). The repeater 1313 may provide the encrypted data decryption keys to the display link receiver A (1315) over a control bus (not shown) between them. The repeater 1313 may also provide the encrypted data decryption keys to the display link receiver B (1319) over a control bus (not shown) between them. In other alternate embodiments, the display link receivers A and B (1315, 1319) may receive the encrypted data decryption keys directly from the control bus 1305.

The digital data 1310 may also contain data other than video including HDTV movie signals, such as, for example, multimedia data. The multimedia data may include one or more of, but is not limited to, video, audio, web contents, graphics, text and other information.

Most of the various systems, subsystems and connections shown in FIG. 13 should be physically secured to protect data and keys while in an unencrypted form. The encrypted keys carried over the control bus 1305 and the encrypted data 1312, 1314 and 1318 preferably are protected from eavesdropping, and preferably do not require additional security measures.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

We claim:

1. A digital video system comprising:
   a digital data input port adapted to receive encoded digital media data and an encrypted first cryptographic key;
   a digital signal decoder coupled with the digital data input port, the digital signal decoder being adapted to:
     receive the encoded digital media data;
     decode the encoded digital media data; and
     receive the encrypted first cryptographic key;
   a control bus coupled with the digital signal decoder, the control bus being adapted to receive the encrypted first cryptographic key from the digital signal decoder;
   a controller coupled with the control bus, the controller being adapted to manage data traffic on the control bus;
   a cryptographic key decryptor coupled with the control bus; the cryptographic key decryptor being adapted to:
     receive the encrypted first cryptographic key from the digital signal decoder via the control bus; and
     decrypt the encrypted first cryptographic key; and
   a data encryptor coupled with the digital signal decoder and the cryptographic key decryptor, the data encryptor being adapted to:
     receive the decoded digital media data;
     receive the first decrypted cryptographic key; and
     encrypt the decoded digital media data using the first decrypted cryptographic key.

2. The system of claim 1, wherein the digital signal decoder comprises a cable television signal decoder.

3. The system of claim 1, wherein the digital signal decoder comprises a high-definition television signal decoder.

4. The system of claim 1, wherein the digital signal decoder comprises a Digital Versatile Disk decoder.

5. The system of claim 1, wherein the control bus is an $I^2C$ control bus.

6. The system of claim 1, further comprising a digital display link coupled with the data encryptor, wherein the data encryptor is further adapted to provide the encrypted digital media data, in DVI format, to a digital media display device coupled with the digital display link.

7. The system of claim 1, further comprising a data storage device coupled with the cryptographic key decryptor, the data storage device being adapted to temporarily store the first cryptographic key.

8. The system of claim 1, wherein the data storage device comprises a random-access memory device.

9. A method of processing digital media data comprising:
   receiving, from a content provider, encoded digital media data via a digital media data input port;
   receiving, with the encoded digital media data, an encrypted first cryptographic key via the digital media data input port;
   decoding the encoded digital media data;
   providing the encrypted first cryptographic key to a cryptographic key decryptor;
   decrypting the encrypted first cryptographic key with the cryptographic key decryptor;
   providing the first decrypted cryptographic key to a data encryptor;
   providing the decoded digital media data to the data encryptor;
   encrypting the decoded digital media data with the data encryptor using the first cryptographic key; and
   providing the encrypted digital media data to a digital media display device via a digital display link.

* * * * *